United States Patent [19]
Erickson

[11] 4,097,734
[45] Jun. 27, 1978

[54] ZERO INDEX FOR ELECTRO-OPTICAL MEASURING DEVICE

[75] Inventor: Kent E. Erickson, Brookside, N.J.

[73] Assignee: Keuffel & Esser Company, Morristown, N.J.

[21] Appl. No.: 767,082

[22] Filed: Feb. 9, 1977

[51] Int. Cl.² .............................................. H01J 3/14
[52] U.S. Cl. ............................ 250/237 G; 250/231 R
[58] Field of Search ......... 250/231 R, 231 SE, 237 R, 250/237 G; 324/175; 356/169, 170

[56] References Cited

U.S. PATENT DOCUMENTS

| | | | |
|---|---|---|---|
| 3,154,688 | 10/1964 | Shepherd | 250/237 G |
| 3,612,881 | 10/1971 | King | 250/237 G X |

*Primary Examiner*—James B. Mullins
*Attorney, Agent, or Firm*—Lionel N. White

[57] ABSTRACT

Means for producing a counter reset pulse at the precise zero datum in an electro-optical measuring device comprises a sub-assembly including a light source, a patterned reticle, and a pair of photosensors, and a cooperating imaging reflector element. Each of the sub-assembly and reflector element are respectively mounted on the separate portions of the measuring device between which relative movement is effected during the measuring operation. Light from the source illuminates a pair of parallel transparent slots in the reticle pattern and is imaged back upon a second pair of transparent windows in the same reticle by the reflector element and is incident upon a pair of photosensors, each of which is associated with one of the windows. Equal illumination of each of the photosensors establishes the precise zero datum in the device and associated electronics provides a counter resetting pulse at that position.

9 Claims, 4 Drawing Figures

ZERO INDEX FOR ELECTRO-OPTICAL MEASURING DEVICE

BACKGROUND

Electro-optical measuring devices have been known and available for some time and essentially comprise light source and photosensor elements having disposed therebetween an optical scale arrangement which variously interrupts the light beam in response to the movement to be measured. The light thus attenuated is incident upon the photosensor to provide a distinctive electrical signal which is utilized in appropriate counting devices, logic circuitry, or the like to yield an indication of the extent of the movement.

Measuring systems of this type may be either absolute or incremental, depending upon the style of the optical scale employed. While in some applications the advantage of absolute encoded optical scales is apparent, the multiplicity of individual coding tracks required in the scale element dictates a substantial size in such a system. On the other hand, although a smaller finely-divided single scale track suffices in the incremental optical scale, accurate measurement with such a device is dependent upon some means for establishing a precise zero datum from which increments of displacement or movement of scale element may be counted.

It is also desirable in the incremental counter style device, particularly when a circular scale is employed, as in angle encoders, that a zero index by included in order to automatically reset associated counters at the zero datum or zero angle point in the scale cycle. In this manner the accumulation of missed counts during any course of measurement is precluded.

Whether associated with linear or circular displacement measuring devices, a zero datum indicator or index utilized with an incremental optical scale and counting system serves to reset the counting means of the system at a precise location or attitude in the device. Preferably the index functions independently of the primary scale code and is effective regardless of the direction of movement involved in the measurement.

SUMMARY

The zero index of the present invention is one which is particularly suitable for use in an electro-optical displacement measuring device such as described in U.S. Pat. No. 3,768,911. An incremental measuring system of this general type may be utilized in linear measuring apparatus used to control machine tool equipment and the like, or may be employed in angle encoding apparatus such as azimuth and elevation indicators in surveying instruments.

When utilized in time- or displacement-based angle measuring systems, the zero index provides a precise datum from which measuring increments may be counted. Such a datum is particularly advantageous when associated with the elevation attitude of the sighting instrument in a surveying system and is normally related to the zenith in common surveying practice.

As thus used in association with the elevation of vertical circle scale of a surveying instrument, the zero index of the present invention comprises a sturdy, compact sub-assembly including light source, masking reticle, and photosensor elements which is adjustably fixed in the alidade standard of the surveying instrument closely adjacent to the movable verticle circle, and an imaging reflector attached to the vertical circle so as to intercept the beam of light from the source once during each revolution of the vertical circle and direct the light image-wise back upon the sub-assembly reticle and photosensor elements.

At the zero datum location the respective images of a first pair of parallel transparent slots in the illuminated reticle are imaged by the reflector back upon the reticle over a second pair of transparent windows through which the light is incident in precisely equal amounts upon a pair of overlying Photosensors. With movement of the imaging reflector, and thus the circle scale, through the zero datum point, the illuminated images are caused to sweep across the photosensor windows resulting in the development of a pair of electrical signals which intersect in opposite-going directions at precisely the zero datum of the device.

Crossover detector circuitry is provided in the system to sense the instant of intersection of the electrical signals in order to provide the reset pulse which establishes the zero angle, or zenith, in the surveying instrument. A digital logic network is included in the circuitry in order to distinguish the active, illuminated zero datum of the device from all other conditions in which the photosensors might be equally illuminated or, as will normally be the most prevalent condition, are lacking in illumination in equal degrees.

The zero index device of the present invention may be physically located at any convenient position in the measuring or surveying instrument. That is to say, its position within the greater instrument need not be at the nominal zero of the linear or circular scale. By virtue of the fact that the index functions independently of the measuring scale, the pickup sub-assembly may be placed wherever along the scale there is space most readily available and the zero datum related back to the scale disposition via the electronics of the system. It would thus not be unusual in a surveying system, for example, to situate the pickup and reflector elements in the region of sixty degrees elevation and arrange that whenever the line of sight is at the horizontal the display of the system register at that point a reading of ninety degrees, the extent of depression from the zenith. The precise relationship between the nominal zero of the instrument and the zero datum generated by the index may be established by coarse physical adjustment during assembly of the instrument followed by finer adjustment in the electronics of the device.

DRAWINGS

In the accompanying drawings:

FIG. 1 shows, in section, an embodiment of the zero index device of the present invention;

FIG. 2 presents an elevation view of the reticle and photosensor sub-assembly of the zero index device;

DESCRIPTION

Figure 1:
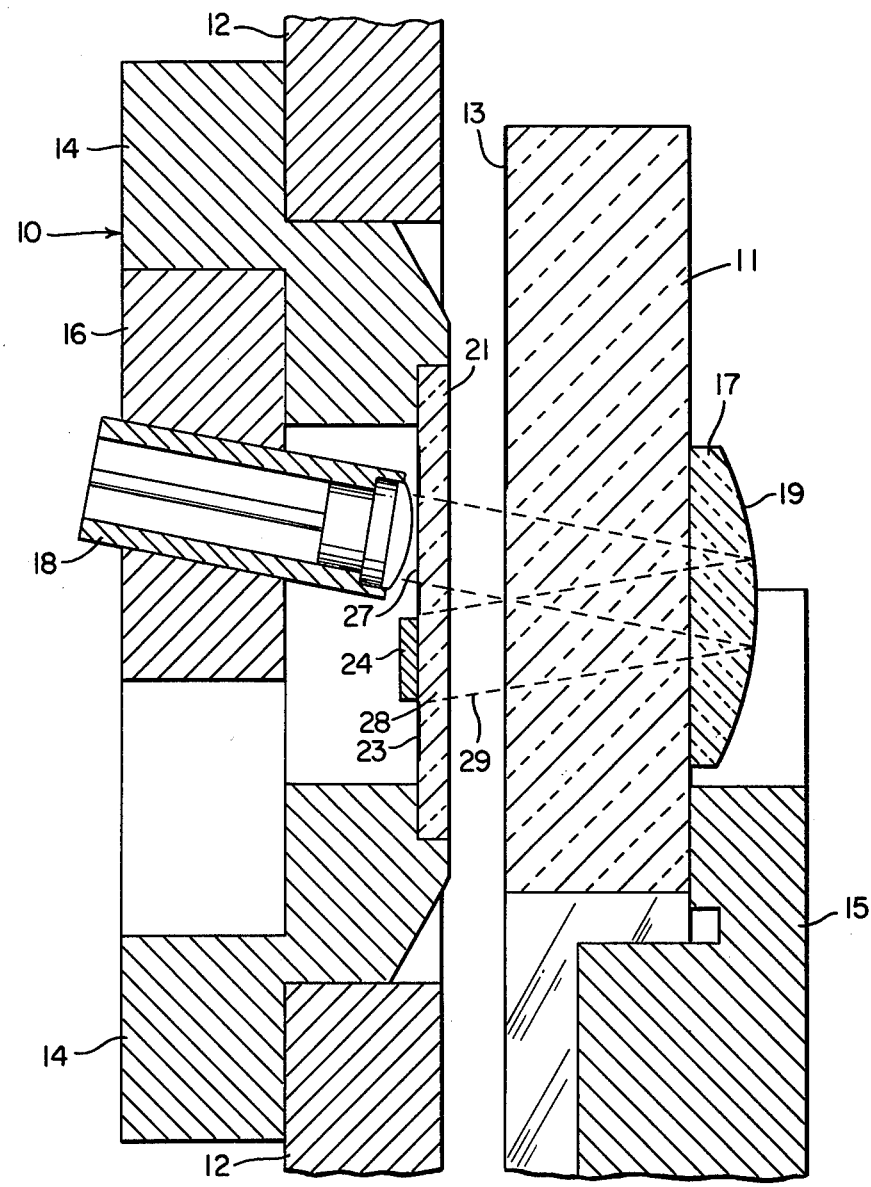

A preferred structure of the present invention as it is employed as the zero angle, or zenith, index in a surveying instrument is shown in FIG. 1. A convenient portion 12 of the instrument alidade standard adjacent to the vertical circle 11 is adapted to receive the body 14 of pickup sub-assembly 10. Affixed to pickup body 14 by means of a suitable adhesive is reticle plate 21. Light source 18, such as, for example, an SG1004 GaAs photodiode supplied by RCA Corporation, is mounted in carrier 16 which in turn is supported in body 14 by adjustable means, not shown. Such means for adjustment are utilized during assembly to center the illumination from source 18 upon reticle slots 25, 27. Completing sub-assembly 10, photosensors 22, 24 are cemented to plate 21 over reticle windows 26, 28. A photosensor suitably responsive to the 940 nm emissions of the above-noted light source is, for example, the SDC 420 photodiode device supplied by Spectronics Incorporated, Richardson, Texas.

The location in alidade body 12 for pickup sub-assembly 10 is conveniently selected adjacent the periphery of vertical circle body 11 as it is supported in circle mount 15 for rotation with the telescope of the surveying instrument. The circle scale, per se, shown in part at 13, cooperates with its own electro-optical pickup, not shown, and comprises no part of the described embodiment of the present invention.

Cemented to the rear surface of transparent circle body 11 is an imaging reflector 17 whose spherical surface 19 is silvered to reflect light from source 18 to incidence upon photosensors 22, 24. Thus, at the zero datum position of verticle circle 11 illuminated slots 25, 27 in reticle pattern 23 are imaged along light path 29 by the imaging reflector 17 to fall equally upon respective reticle windows 26, 28 and overlying photosensors 22, 24.

Figure 2:
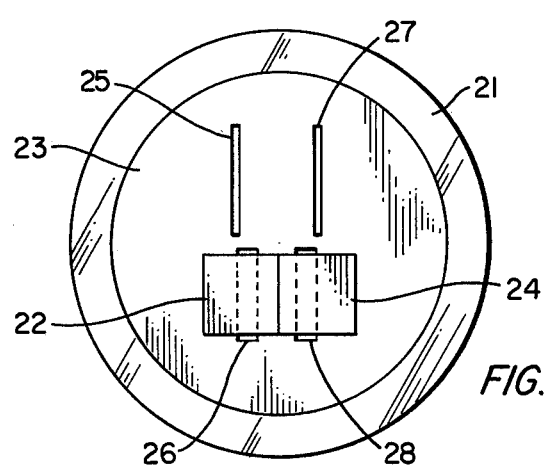

The reticle and photosensor combination of pickup sub-assembly 10 is shown in greater detail in FIG. 2. Transparent plate 21 of glass or other transparent material is silvered or otherwise opaqued in a pattern 23 providing transparent slots 25, 27 and windows 26, 28. Cemented to reticle plate 21 over windows 26, 28 are photosensors 22, 24.

Considering the structure thus described, it will be seen that as the telescope or sighting element of the surveying instrument approaches the zenith datum position, imaging reflector 17 will begin its interception of the paths of illumination proceeding from light source 18 through reticle slots 25, 27. With continued movement of the circle the images of slots 25, 27 will proceed to sweep across the rear surface of reticle plate 21 along a route substantially centered on reticle windows 26, 28. Illumination through windows 26, 28 of first one and than the second of photosensors 22, 24 follows further movement of circle 11 until, at the precise zenith datum, the images of slots 25, 27 fall, respectively, equally upon reticle windows 26, 28 and illuminate to an equal extent photosensors 22, 24. At that precise zero angle or zenith datum, electronic circuitry associated with photosensors 22, 24 provides a pulse which is directed to counting means in the measuring system to reset the elevation indicator to the desired state; for example, to display "90.000°" as indicative of a horizontal line of sight.

Figure 3:
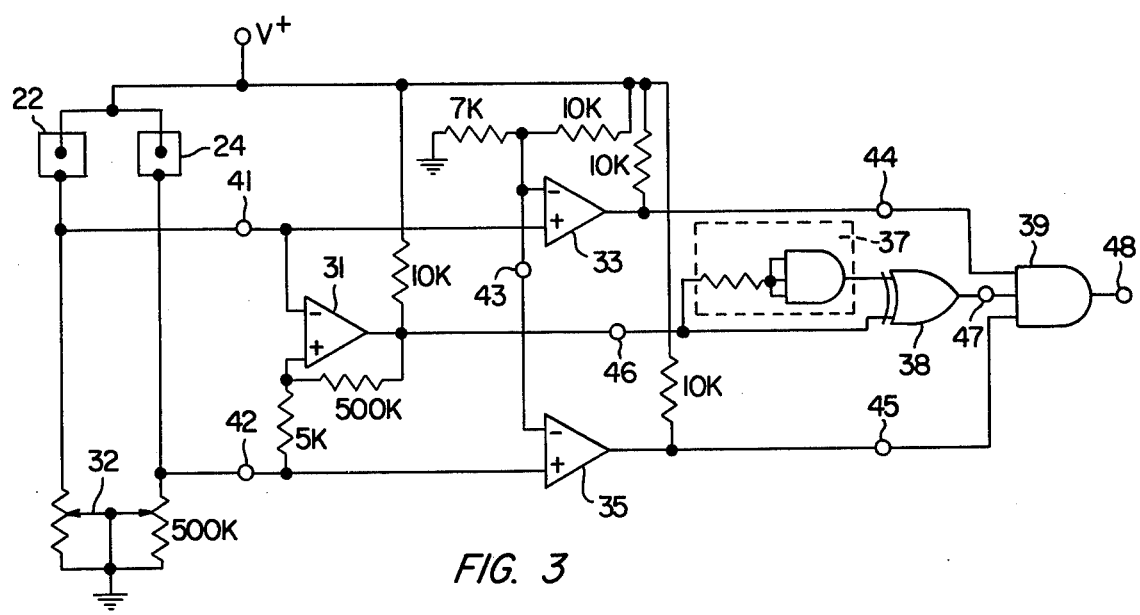
FIG. 3 is a schematic representation of the electronic circuitry of the device.

A preferred electronic circuit employed in the present invention is schematically shown in FIG. 3. Operating from a convenient 5 V DC source, the circuit includes potentiometer means 32 as the photosensor circuit load resistance, thus providing a convenient means to balance the voltages derived from photosensors 22, 24 while the system is mechanically set precisely at the zero datum during assembly. Thereafter, any voltage differences between the respective photosensor channels will be due only to a mechanical displacement from the zero datum.

Generally, the circuit shown in FIG. 3 comprises a number of voltage comparators, such as provided in the LM239 device of National Semiconductor Corporation, Santa Clara, California, to monitor the difference in the voltages derived from photosensors 22, 24 during operation of the zero index device. Comparator 31, provided with an amount of positive feedback hysteresis to ensure strong output transitions, constitutes the primary means for comparison of the relative illumination of photosensors 22, 24. Comparators 33, 35, on the other hand, each compare the output of the respective photosensors 22, 24 with a reference voltage level in order to ensure that the indication of zero datum occurs only at the single position where the photosensors are positively equally illuminated with the images of slots 25, 27. That is to say, the reference voltage comparators 33, 35 prevent a false indication of zero datum during such times as photosensors 22, 24 establish equal voltage levels as a result of total lack of illumination.

Logic elements included in the circuit to translate the voltage transitions from the comparators into a single reset pulse at the precise zero datum comprise delay means 37, Exclusive OR gate 38, and AND gate 39. Due to the momentary delay established by means 37, transitions in the state of the output from comparator 31 at crossovers in the respective voltages from differences in illumination of photosensors 22, 24 are momentarily presented to gate 38 as dissimilar state pairs, thereby enabling the presentation of high level spikes at gate 39 as each such crossover occurs. The conditions of the outputs from reference comparators 33, 35 permitting, such spikes will proceed from gate 39 as zero datum reset pulses.

Figure 4:
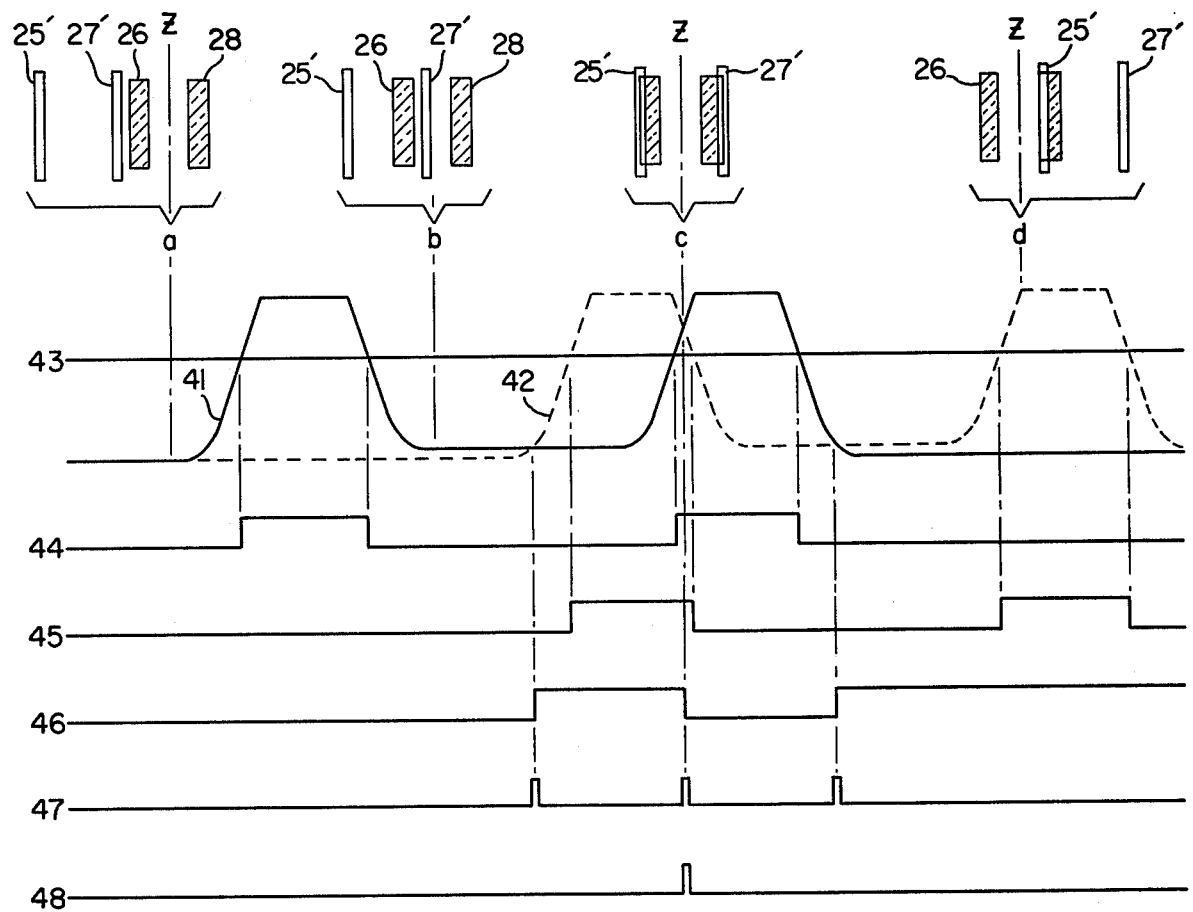
FIG. 4 is a representation of the relationship, during operation of the zero index device, among the spatial alignment of the reticle images, the generated electrical signal, and the resulting digital logic diagram.

The operation of the zero index of the present invention may be followed in the schematic representations set out in FIG. 4. In a sequence of four diagrams, a–d, across the top of FIG. 4 there are represented reticle windows 26, 28 and the images 25', 27' of the respective illuminated reticle slots, as each of these elements would appear in the plane of the sensitive faces of photosensors 22, 24. As earlier noted, the reticle windows 26, 28 are mechanically fixed with respect to the zero datum of the associated instrument, thus these window elements are shown as being set precisely equally astride the datum, represented at Z.

In considering the sequence, one should view these diagrams, a–d, as progressive movements of images 25', 27' from left to right in a manner causing them to sweep across the fixed reticle windows 26, 28. Thus, in diagram a, the illuminated images are approaching the zenith datum position, yet neither has intercepted and illuminated reticle windows 26, 28, or more precisely, those portions of photosensors 22, 24 which overlie the respective reticle windows. In diagram b, the leading image 27' has reached the zero datum position and in the course of its movement to that point has passed completely across the face of reticle window 26. Image 25', however, has yet to come into incidence with window 26.

Diagram c represents the relative positions of images 25', 27' upon reticle windows 26, 28 at the precise zero datum position where they equally illuminate portions of the respective photosensors 22, 24. Further movement of the measuring scale through the zero datum position brings about the spatial relationship represented in diagram d where image 25' is illuminating window 28 to a maximum degree and image 27' has moved beyond the field of view of both windows 26, 28.

In the schematic set out in FIG. 3, a number of test locations 41 - 48 are shown. Diagrams of the voltage level appearing at each of these test locations are set out in FIG. 4 as they relate in a representative manner to the sequence of respective movements between illuminated images 25', 27' and reticle windows 26, 28 as shown in diagrams *a* - *d*. Thus, at 41 appears the trace of the fluctuating voltage resulting from the passage of illuminated images 25', 27' across reticle window 26 and photosensor 22. The trace is depicted in its theoretical ideal, proceeding from minimum voltage at total darkness to a constant maximum voltage prior to falling again to the minimum dark conductivity prior to rising once again with passage of the second illuminated image 27' and finally falling to the minimum where it remains throughout the remainder of the instrument cycle or until movement of the scale is reversed to bring the illuminated images back toward the zenith datum position. Likewise, the illumination of photosensor 24 through reticle window 28 is represented at trace 42.

The direct comparison between the voltage output traces 41, 42 is shown at 46 where the transition occuring at the crossover of the respective and falling voltages 41, 42 takes place at the precise zero datum location as shown in diagram *c*. Trace 46 also depicts the possible transitions occuring at the extremes of window illumination bounding the zenith datum. However, these unstable transitions are eliminated in the circuitry logic so as to ensure the generation of a functional resetting pulse only at the precise datum location.

Since, as will be apparent from the foregoing, a condition of equal illumination at reticle windows 26, 28 is the indicator of the location of the associated scale at the precise zero datum, the equal illumination of the reticle windows under conditions depicted in diagrams *a, b* of FIG. 4, that is, where the windows to the same extent remain dark, there would otherwise be a possibility of occurence of erroneous zero datum indicator signals but for the incorporation of a substantial reference voltage shown at 43. Comparison between this reference voltage and the photosensor output voltage traces 41, 42 will be seen to ensure the appearance of an operative comparator output voltage level 44, 45 at gate 39 only when the photosensor voltages rise above the reference level; i.e. when, in the narrow zone bounding the true datum, illuminated images 25', 27' are, in fact, incident upon reticle windows 26, 28. Thus, of the spikes generated at the output of gate 38, as shown in trace 47, only that one occuring at the high level crossover of traces 41, 42 will be coincident with the operable levels of the outputs of reference comparators 33, 35 to yield the single precise zero datum reset pulse at 48.

The described embodiment of the present invention has exhibited a sufficient degree of precision to ensure the generation of reset pulses within the range of a zero datum which is, regardless of the direction of measured movement, narrower than the least practical width of optical scale cycle in the measuring system. As a result of the fact that the zero datum is determined at a single crossover rather than from a momentary increase in the intensity of an isolated light beam, the datum does not suffer from the disadvantage heretofore experienced in other systems where overlap of the range of the indicated zero datum into one or more adjacent measuring scale cycles caused lost measurement counts. Further, a doubling of sensitivity in the present device, achieved from the image reflection, enables the generation of zero reset pulses without loss of measurement increments in systems having scales even in the range of $20\mu$m per line pair.

What is claimed is:

1. In a measuring system having at least two bodies arranged for close relative movement therebetween in the course of effecting such measure, an improved zero index device capable of providing a distinct indicator of a precise zero datum in said measuring course, said index device comprising:
   (a) means associated with one of said bodies for projecting the image of a pair of parallel illuminated slots;
   (b) a pair of photoelectric sensors having respective finite fields of view of incident illumination;
   (c) means associated with the other of said bodies for directing respective ones of said slot images to incidence upon respective ones of said sensor fields of view in such a manner as to effect, with relative movement between said bodies in the vicinity of the designated zero datum position, an increase in the area of illuminated field of one of said sensors concurrently with a decrease in the area of illuminated field of the other of said sensors, whereby, precisely at said designated zero datum position, the respective sensor fields are equally illuminated; and
   (d) means electrically to ascertain said equal illumination of said sensor fields and to provide an indexing signal indicative thereof.

2. A zero index device according to claim 1 wherein:
   (a) said photoelectric sensors are associated with said one of said bodies; and
   (b) said image-directing means associated with said other of said bodies is an imaging reflector arranged to intercept and reflect said slot images back toward said one of said bodies to incidence upon the fields of view of said sensors.

3. A zero index device according to claim 2 wherein:
   (a) said image projecting means is affixed to said one of said bodies and comprises a light source and a patterned reticle plate including said parallel slots; and
   (b) said photoelectric sensors are affixed to said reticle plate, said pattern of which plate defines said sensor fields of view.

4. A device according to claim 3 wherein said field-defining reticle plate pattern comprises a pair of narrow rectilinear windows disposed parallel to the longitudinal axes of said incident slot images and within the lateral span of said images.

5. In a measuring system having at least two bodies arranged for close relative movement therebetween in the course of effecting such measure, an improved zero index device capable of providing a distinct indicator of a precise zero datum in said measuring course, said index device comprising:
   (a) an electro-optical pickup sub-assembly affixed to one of said bodies, said sub-assembly comprising:
      (1) a reticle plate having an opaque pattern thereon providing a pair of juxtaposed parallel transparent slots and, longitudinally disposed from said slots, a pair of juxtaposed narrow parallel transparent windows,
      (2) a light source for directing a beam of light through said transparent slots, thereby to project an illuminated image of said slots, and
      (3) a pair of photoelectric sensors, each overlying a respective one of said reticle plate windows, thereby to provide electrical signals proportional to the illumination incident upon said windows;

(b) an imaging reflector affixed to the other of said bodies to intercept said projected image upon relative movement of said bodies in the vicinity of the designated zero datum position and direct said image to incidence upon said reticle plate along a path traversing said windows and overlying sensors to thereby effect an increase in the illumination incident upon one of said sensors concurrently with a decrease in the illumination incident upon the other of said sensors, whereby, precisely at said designated zero datum position, the respective sensors are equally illuminated; and (c) electrical means in circuit with said sensor pair to provide an indexing signal in response to said equal illumination thereof.

6. A zero index device according to claim 5 wherein:
(a) said one of said bodies is a surveying instrument alidade part which is substantially immobile with respect to the rotational axis of a measuring circle in said instrument; and
(b) the other of said bodies rotates about said axis.

7. An index device according to claim 5 wherein said electrical means comprises:
(a) an electrical comparator across the outputs of said sensors; and
(b) means in circuit with the output of said comparator for generating an electrical pulse at the transition in the output state of said comparator occurring at crossovers of voltage output levels of said sensors.

8. An index according to claim 7 wherein said pulse-generating means comprises:
(a) means in circuit with said comparator output for momentarily delaying a transition of signal at said output; and
(b) an Exclusive OR gate the inputs of which are in circuit, respectively, with the outputs of said comparator and said delay means.

9. An index device according to claim 8 wherein said pulse-generating means further comprises:
(a) a pair of electrical comparators across a source of a reference voltage and the outputs, respectively, of said sensors; and
(b) an AND gate the inputs of which are in circuit, respectively, with the outputs of said reference comparators and said Exclusive OR gate.

* * * * *